US008057211B2

(12) United States Patent
Zhou et al.

(10) Patent No.: US 8,057,211 B2
(45) Date of Patent: Nov. 15, 2011

(54) STAMPING MOLD ADAPTED TO STAMP CHARACTERS IN WORKPIECES

(75) Inventors: Shu-Wei Zhou, Shenzhen (CN); Fu-Shun Huang, Taipei Hsien (TW); Chia-Hsiang Ou, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 357 days.

(21) Appl. No.: 12/500,618

(22) Filed: Jul. 10, 2009

(65) Prior Publication Data

US 2010/0163706 A1 Jul. 1, 2010

(30) Foreign Application Priority Data

Dec. 30, 2008 (CN) .......................... 2008 1 0306659

(51) Int. Cl.
*B29C 59/02* (2006.01)

(52) U.S. Cl. ........ 425/183; 425/193; 425/385; 425/468; 249/103; 101/6

(58) Field of Classification Search .................. 425/183, 425/184, 186, 191, 192 R, 193, 195, 385, 425/577, 466–468, 470, DIG. 10, DIG. 127, 425/DIG. 249; 249/102, 103; 101/4, 6, 93.21, 101/393, 394, 485
See application file for complete search history.

(56) References Cited

U.S. PATENT DOCUMENTS

| | | | | |
|---|---|---|---|---|
| 2,485,284 | A * | 10/1949 | Guelph | 425/444 |
| 4,384,702 | A * | 5/1983 | Boskovic | 249/103 |
| 4,452,420 | A * | 6/1984 | Lundquist | 249/175 |
| 4,708,314 | A * | 11/1987 | Kuhling | 249/103 |
| 5,208,053 | A * | 5/1993 | Vandenberg | 425/572 |
| 5,340,298 | A * | 8/1994 | Beatty et al. | 425/183 |
| 5,620,716 | A * | 4/1997 | Opitz | 425/169 |
| 5,788,872 | A * | 8/1998 | Uratani | 249/103 |
| 5,902,512 | A * | 5/1999 | Streit | 249/103 |
| 6,120,275 | A * | 9/2000 | Winget et al. | 425/130 |
| 6,889,954 | B2 * | 5/2005 | Navarra Pruna | 249/103 |
| 6,966,257 | B2 * | 11/2005 | Uratani | 101/4 |
| 7,503,542 | B2 * | 3/2009 | Uratani | 249/103 |

(Continued)

FOREIGN PATENT DOCUMENTS

CN 2736169 Y 10/2005

(Continued)

*Primary Examiner* — Joseph Del Sole
*Assistant Examiner* — Dimple Bodawala
(74) *Attorney, Agent, or Firm* — Altis Law Group, Inc.

(57) ABSTRACT

A stamping mold includes a base, a mold holder and a stripper. The base defines a first through hole and includes a protruding block. The mold holder defines a second through hole and a plurality of receiving holes, and each receiving hole receives a mold insert and selectively corresponds to the protruding block. The mold holder is located on a top of the base and touches the protruding block. The stripper includes a cover defining a plurality of holes and a positioning shaft. The stripper is located on the mold holder via the positioning shaft passing through the second and the first through hole, and a free end of the positioning shaft is blocked under the base. The mold holder can rotate about the positioning shaft. When the stripper moves to a lowest location, the mold insert on the protruding block protrudes from the corresponding hole of the cover.

20 Claims, 8 Drawing Sheets

U.S. PATENT DOCUMENTS

| | | | | |
|---|---|---|---|---|
| 7,879,280 | B2 * | 2/2011 | Randall et al. | 264/328.7 |
| 7,901,197 | B2 * | 3/2011 | Sung et al. | 425/193 |
| 2007/0212439 | A1 * | 9/2007 | Chiang | 425/468 |
| 2008/0264284 | A1 * | 10/2008 | Hutchison et al. | 101/389.1 |
| 2009/0266134 | A1 * | 10/2009 | Huang et al. | 72/327 |

FOREIGN PATENT DOCUMENTS

| | | | | |
|---|---|---|---|---|
| DE | 3223346 | A1 | * | 1/1985 |
| EP | 1473169 | A2 | * | 4/2004 |
| JP | 05031768 | A | * | 2/1993 |

* cited by examiner

STAMPING MOLD ADAPTED TO STAMP CHARACTERS IN WORKPIECES

BACKGROUND

1. Technical Field

The present disclosure relates to a stamping mold to stamp characters in workpieces.

2. Description of Related Art

Generally, a workpiece will have a trademark or manufacturing date stamped in it. A commonly used stamping mold employs only one mold insert for each character in the stamp design, requiring an operator to frequently change out mold inserts, which is inconvenient and inefficient.

Therefore, a need exists in the industry to overcome the described limitations.

DETAILED DESCRIPTION

A stamping mold of this disclosure may be used in a punch, such as a CNC turret punch, to stamp characters, such as to indicate a manufacturing date, in workpieces.

Figure 1:
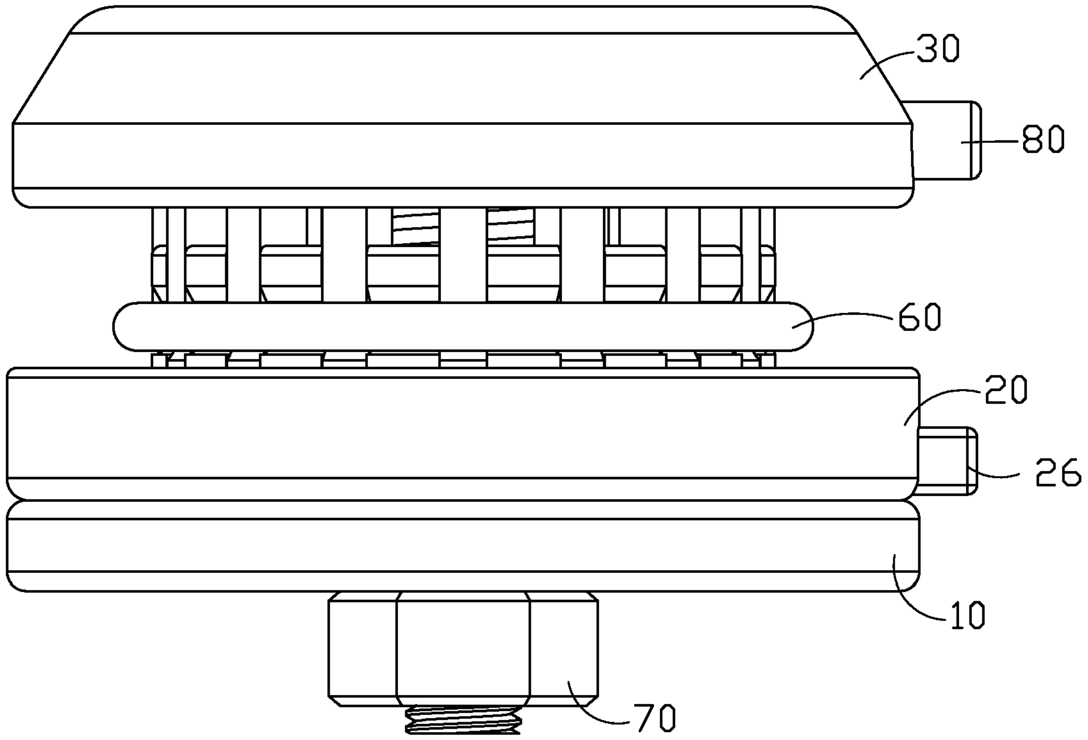
FIG. 1 is a front view of a stamping mold in accordance with the disclosure.
Figure 2:
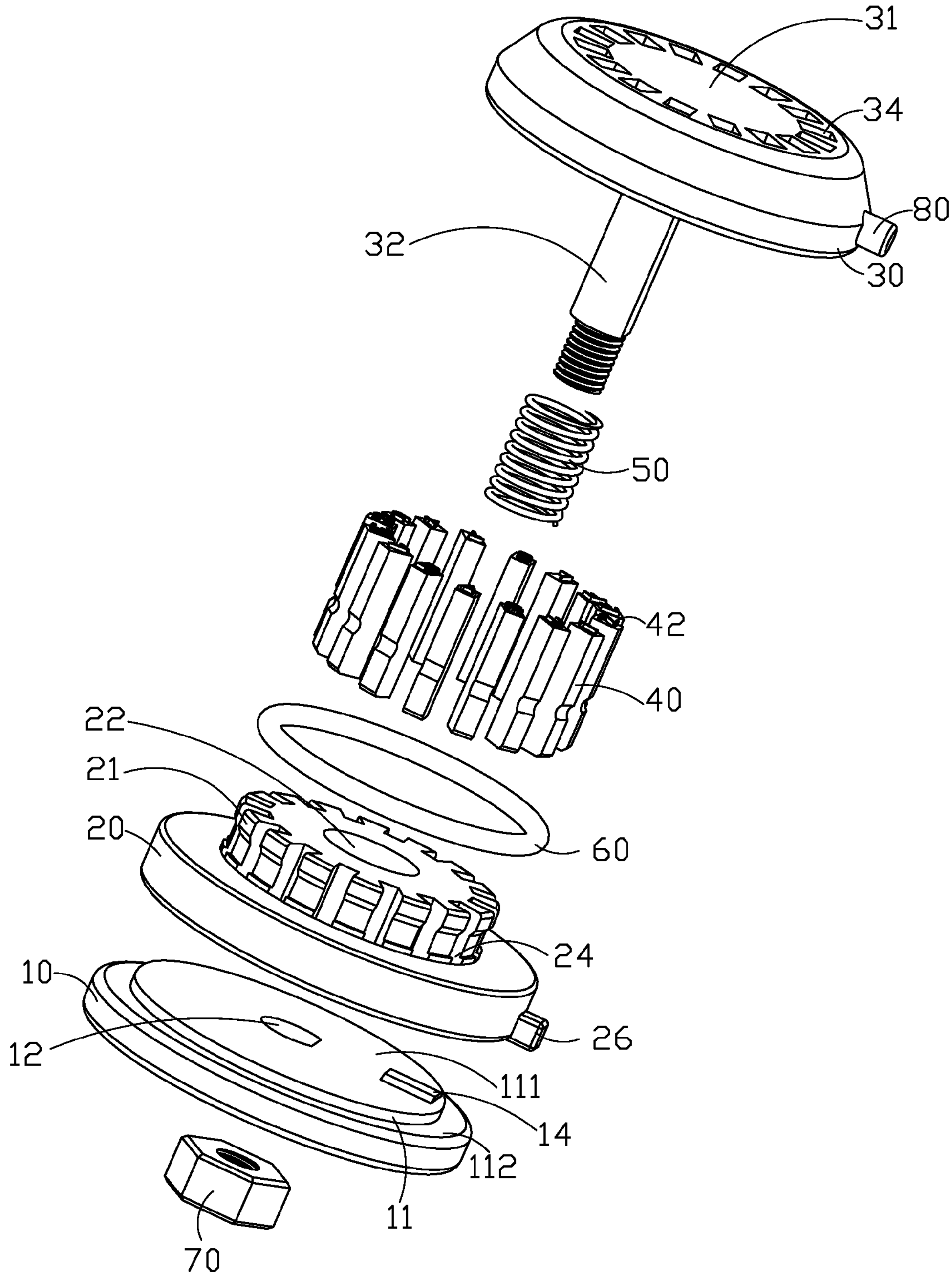
FIG. 2 is an exploded, perspective view of the stamping mold of FIG. 1.

Referring to FIG. 1-FIG. 2, the stamping mold includes a base 10, a mold holder 20, a stripper 30 and a spring 50. The mold holder 20 receives a plurality of mold inserts 40 therein, and is installed on the base 10. The spring 50 is located between the mold holder 20 and the stripper 30

Figure 3:
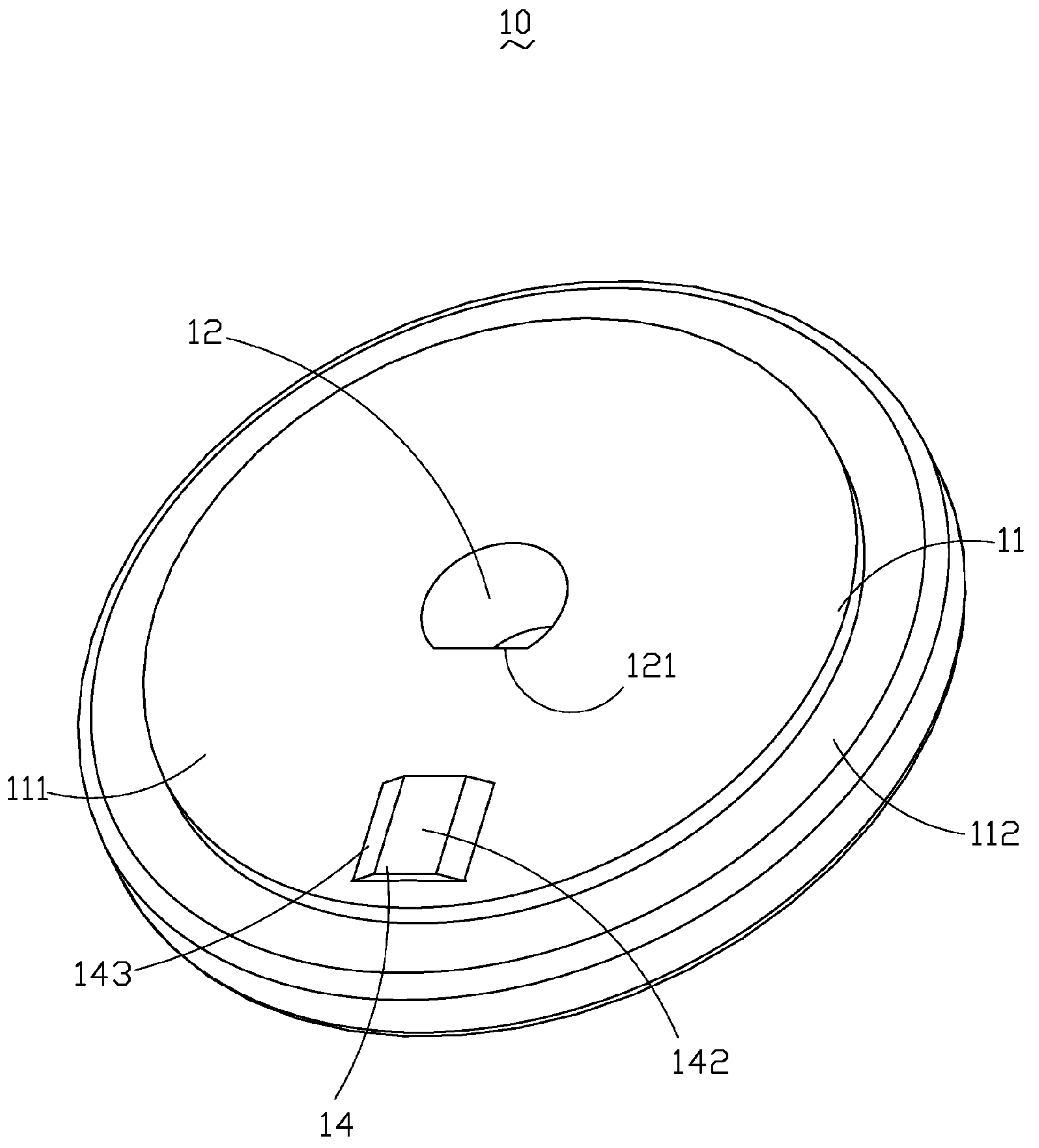
FIG. 3 is a perspective view of a base of the stamping mold of FIG. 1.

Referring to FIG. 3, the base 10 includes a cylindrical convex stage 11. The convex stage 11 includes a supporting surface 111 located on a top of the convex stage 11. A first through hole 12 including a positioning portion 121 is defined in a center of the convex stage 11. A protruding block 14 perpendicularly projects from the supporting surface 111. In this embodiment, the protruding block 14 is close to an edge of the supporting surface 111. The protruding block 14 includes a top surface 142 and two opposing sloped side surfaces 143. The two sloped side surfaces 143 communicate with the top surface 142 with the supporting surface 111 along a circumference direction of the supporting surface 111. Here, the top surface 142 is a plane. The base 10 is disk-shaped, and a flange 112 is formed between the convex stage 11 and a periphery of the base 10.

Figure 4:
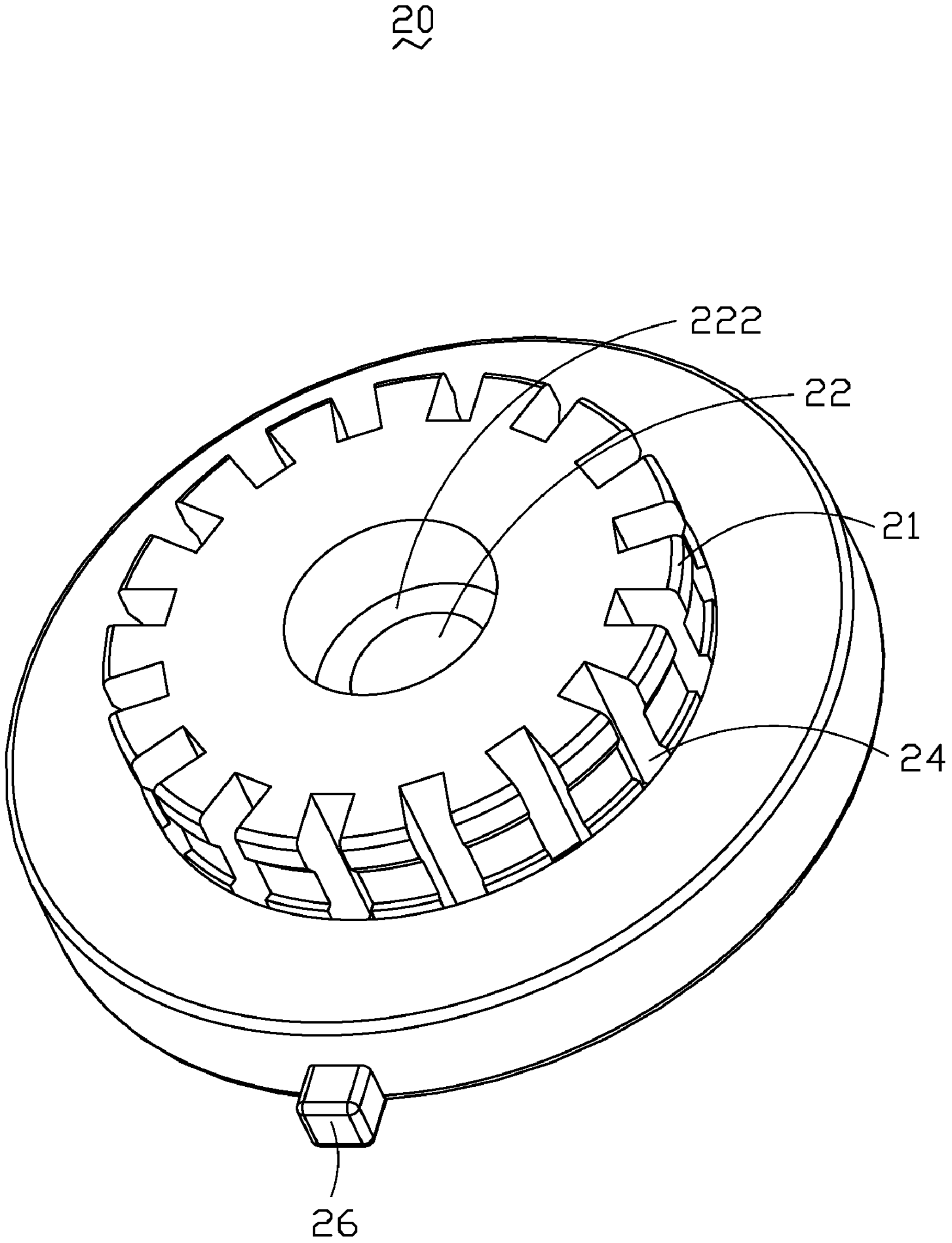
FIG. 4 is a top perspective view of a mold holder of the stamping mold of FIG. 1.

Referring to FIG. 4, the mold holder 20 includes a cylindrical protrusion 21 located on a top of the mold holder 20. The protrusion 21 defines a second through hole 22 and a plurality of receiving holes 24. The second through hole 22 in communication with the first through hole 12 is defined in a center of the protrusion 21. In this embodiment, the second through hole 22 is a circular stepped hole, and includes a stepped surface 222 facing the top of the mold holder 20. The plurality of receiving holes 24 arranged in a circular array around a center of the second through hole 22 extends through the mold holder 20. In this embodiment, the plurality of receiving holes 24 are defined in a periphery of the protrusion 21. Furthermore, a central line of each of the receiving holes 24 is parallel with an axis of the second through hole 22. The receiving holes 24 are used to receive the plurality of mold inserts 40.

Figure 5:
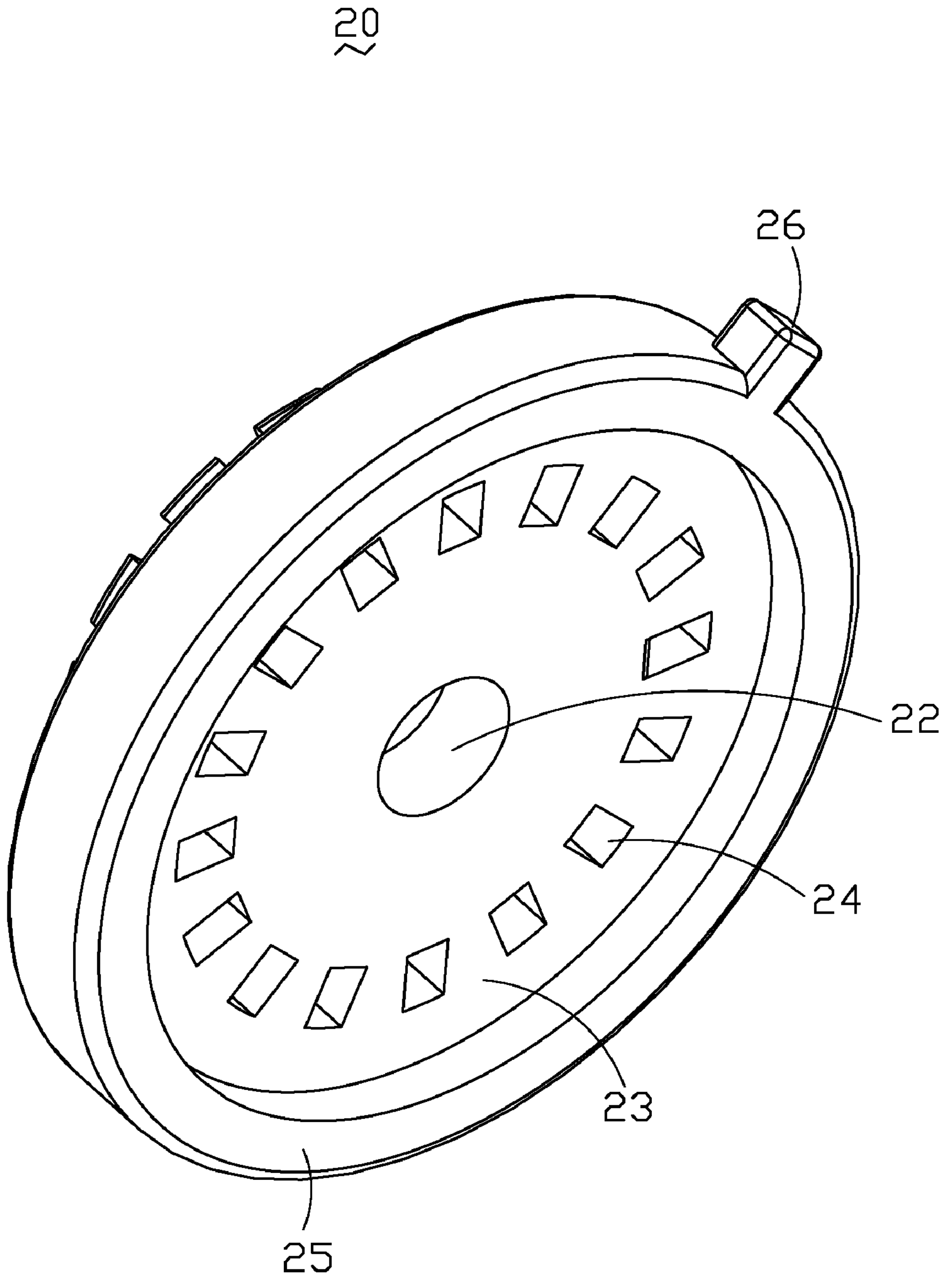
FIG. 5 is a bottom perspective view of the mold holder of FIG. 4.

Referring to FIG. 5, the mold holder 20 is disk-shaped, and includes a bottom surface 23 and an annular supporting portion 25 extending downwardly from an edge of the bottom surface 23. The bottom surface 23 is opposite to the supporting surface 111, and touches the top surface 142 of the protruding block 14 after assembly. The mold holder 20 further includes a handle 26 projecting outwardly from a periphery of the supporting portion 25.

Figure 7:
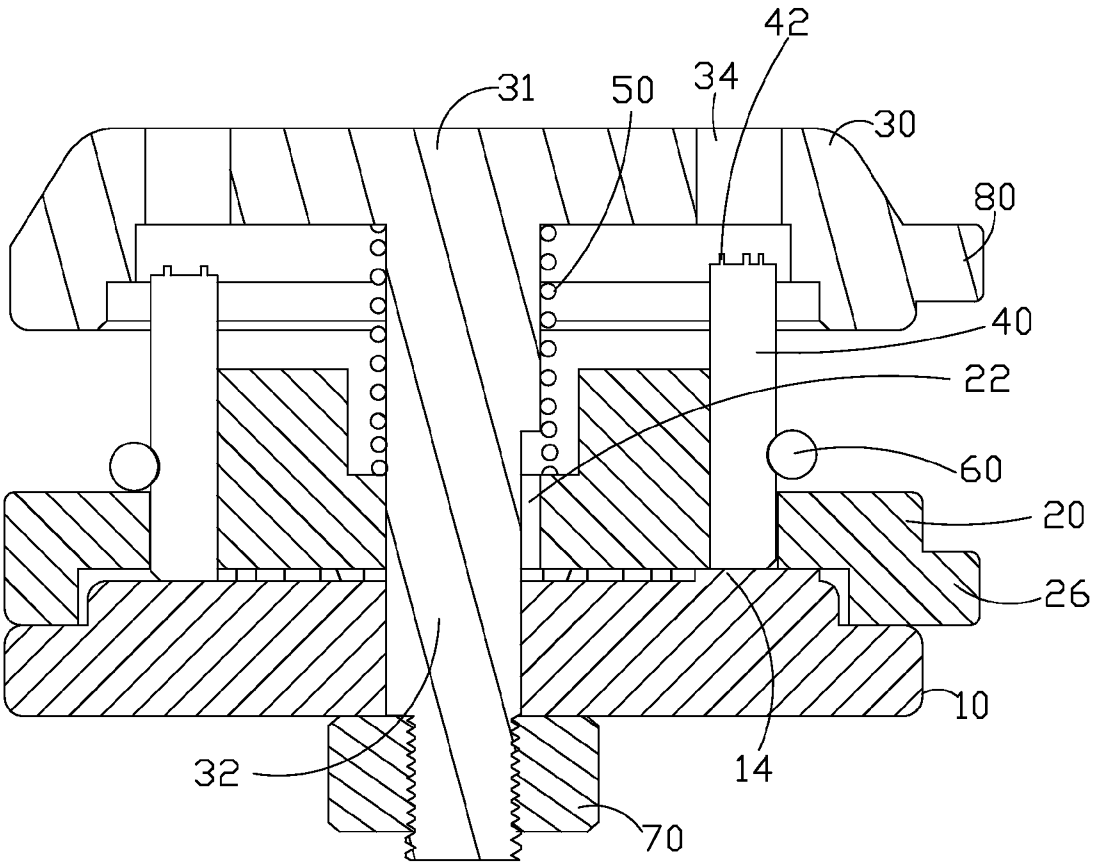
FIG. 7 is a cross-section side view of the stamping mold of FIG. 1 in an initial position.

Referring to FIG. 2 and FIG. 7, the mold inserts 40 are movably received in the receiving passage holes 34, respectively, and kept in the receiving passage holes 34 by an elastic ring 60 fitting around the plurality of mold inserts 40. Each mold insert 40 includes a character 42, such as letters “A”, “B”, “C”, “D”, etc., located on a top of the mold insert 40. A height of each character 42 is equal to that of the protruding block 14.

Figure 6:
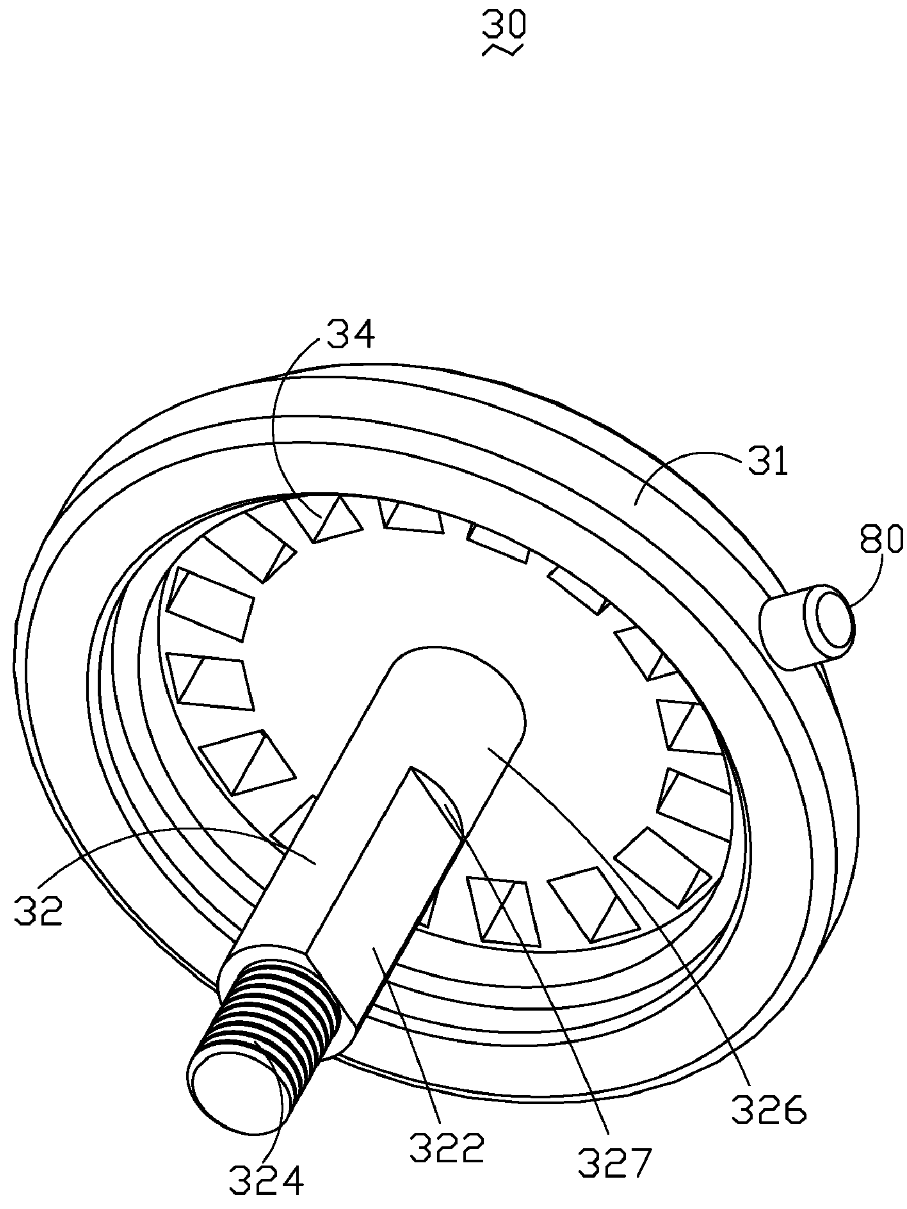
FIG. 6 is a perspective view of a stripper of the stamping mold of FIG. 1.

Referring to FIG. 6, the stripper 30 includes a cover 31 and a positioning shaft 32 projecting vertically from the cover 31. The positioning shaft 32 includes a positioning portion 322, a stopper portion 324, and a connecting portion 326. The stopper portion 324, formed as a screw, is located at a free end of the positioning shaft 32. The connecting portion 326 connects the positioning portion 322 and the cover 31. A stop surface 327 vertical to the positioning shaft 32 is formed between the positioning portion 322 and the connecting portion 326.

The positioning shaft 32 movably passes through the second through hole 22 of the mold holder 20 and the first through hole 12 of the base 10, in turn, and the stopper portion 324 is stopped below the base 10 to prevent the positioning shaft 32 from being removable from the first and second through hole 12, 22. In this embodiment, a nut 70, as a stop member, mates with the stopper portion 324 to prevent the positioning shaft 32 from moving out of the first and second through holes 12, 22. The positioning portion 322 matches with the positioning portion 121 of the first through hole 12 of the base 10 to prevent the stripper 30 from rotating relative to the base 10.

The cover 31 defines a plurality of passage holes 34 arranged in a circular array around a center of the positioning shaft 32. The passage holes 34 of the cover 31 correspond to the mold inserts 40, respectively, and one of the mold inserts 40 is supported by the top surface 142 of the protruding block 14.

The spring 50 is coiled around the positioning shaft 32 between the cover 31 and the stepped surface 222, and two ends of the spring 50 abut against the cover 31 and the stepped surface 222, respectively. Therefore, the cover 31 is supported upon the mold holder 20 and spaced from the mold inserts 40.

The stamping mold further includes an indicator 80 located on a periphery of the stamping mold to indicate position of the protruding block 14. In this embodiment, the indicator 80 is located on a periphery of the stripper 30, and the vertical projection of the indicator 80 on the supporting surface 111 of the base 10 and the protruding block 14 are located on a same radius of the base 10. In other embodiments, the indicator 80 may be located on the periphery of the base 10.

In assembly, the mold holder 20 is rotatably installed on the base 10 after the mold inserts 40 are installed in the receiving holes 24 of the mold holder 20. The positioning shaft 32 movably passes through the mold holder 20 and the base 10 to install the stripper 30 on the mold holder 20. The spring 50 is coiled around the positioning shaft 32 of the stripper 30 to support the stripper 30 upon the mold holder 20. In this assembled state, the supporting portion 25 abuts against the flange edge 12.

In use, the stamping mold of this disclosure is installed in the CNC turret punch or a punching equipment. The handle 26 of the stamping mold is fixed to a rotatable machine station of the CNC turret punch. The workpiece needed to be marked with characters is disposed upon the stripper 30 of the stamping mold.

Before a punching process, the stamping mold is in an initial position, as shown in FIG. 7. The mold inserts 40 installed in the mold holder 20 are driven to rotate about the positioning shaft 32 of the stripper 30 until one of the mold inserts 40, which is needed to be used to stamp a character on the workpiece, abuts against the top surface 142 of the protruding block 14. That is, the mold holder 10 is driven to rotate about the positioning shaft 32 until one of the receiving holes 24 corresponds to the protruding block 14, so that the mold insert 40 received in the one of the receiving holes 24 is pushed up by the protruding block.

Figure 8:
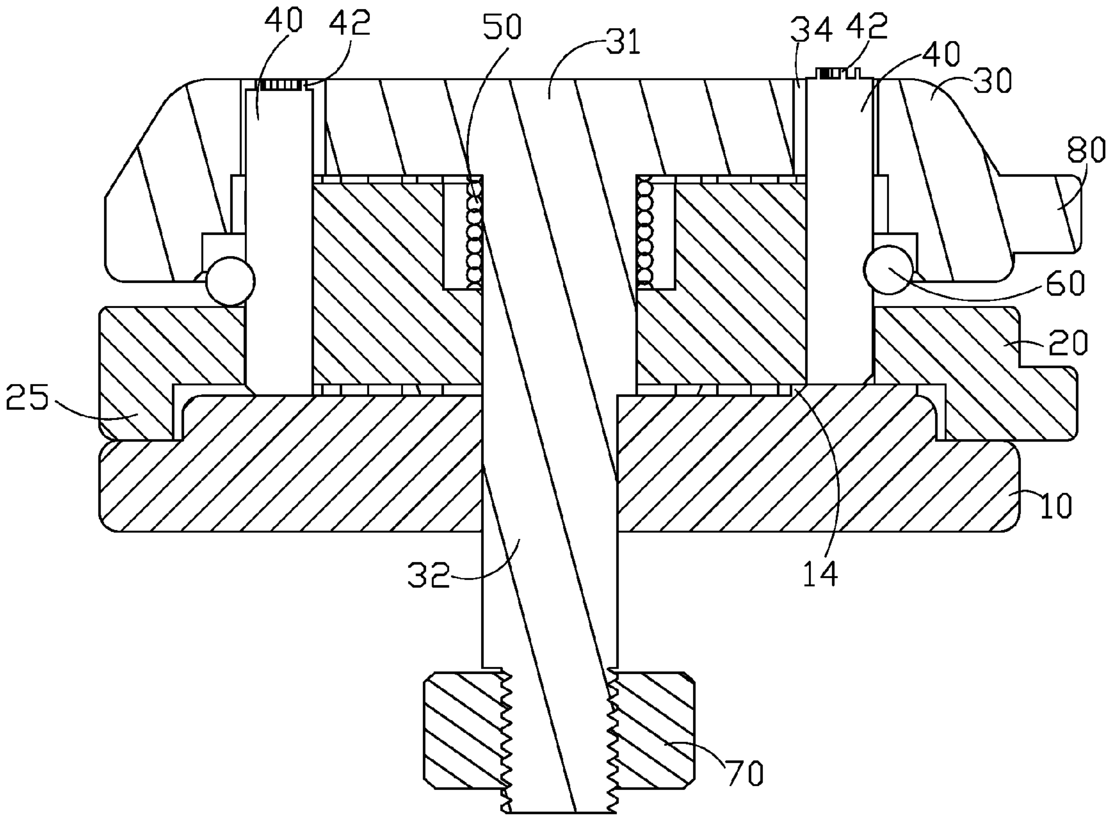
FIG. 8 is a cross-section side view of the stamping mold of FIG. 1 in a punched position.

FIG. 8 shows the stamping mold in a punched position. During punching process, the workpiece is pressed down under a force from the CNC turret punch to make the stripper 30 to move toward the mold holder 20 until the stop surface 327 touches the supporting surface 111. Simultaneously, the pushed mold insert 40 by the protruding block 14 passes through the corresponding hole 34 in the stripper 30 and is exposed out of the cover 10 to stamp. That is, the character 42 of the mold insert 40 protrudes from the cover 31 to be pressed into the workpiece, thereby finishing stamping the character 42 in the workpiece. After punching process, the stripper 30 moves away from the mold holder 20 under an elasticity of the spring 50, then the mold insert 40 is released from the workpiece.

If another character is needed to be marked into the workpiece, it is only needed to rotate the mold holder 20 to make one of the mold inserts 40 having the character to stop at the top surface 142 of the protruding block 14. The mold inserts 40 received in the mold holder 20 are usually used during production, therefore, the stamping mold can stamp characters with different content, without uninstalling the stamping mold and changing the mold inserts, improving convenience and efficiency.

While exemplary embodiments have been described herein, it should be understood that they have been presented by way of example only, and not by way of limitation. The breadth and scope of the disclosure should not be limited by the described exemplary embodiments, but only in accordance with the following claims and their equivalents.

What is claimed is:

1. A stamping mold to stamp characters in workpieces, comprising:

a base comprising a supporting surface and a protruding block extending upwardly from the supporting surface, and defining a first through hole in a center of the supporting surface;

a mold holder rotatably installed on the base, and defining a second through hole corresponding to the first through hole and a plurality of receiving holes arranged in a circular array around the second through hole, wherein each of the plurality of receiving holes receives a mold insert wherein each of the plurality of said mold insert comprises a character locating onto top thereof, and selectively corresponds to the protruding block;

a stripper comprising a cover and a positioning shaft projecting vertically from the cover, the cover defining a plurality of passage holes arranged in a circular array around the positioning shaft, wherein the positioning shaft comprises a positioning portion passing through the second and first through holes in turn, and a stopper portion stopped below the base to prevent the positioning shaft from moving out of the first and second through holes, the positioning portion matches with the first through hole to prevent the stripper from rotating relative to the base; and a spring coiled around the positioning shaft with two ends respectively abutting against the cover and the mold holder to space the cover from the mold holder;

wherein during stamping the characters, the mold holder is driven to rotate about the positioning shaft of the stripper until a selected one of the receiving holes corresponds to the protruding block, so that the mold insert received in the selected one of the receiving holes is pushed up by the protruding block, then the stripper is pressed down toward the mold holder, and the pushed mold insert passes through corresponding one of the passage hole in the stripper and exposed out of the cover to stamp the workpieces.

2. The stamping mold as claimed in claim 1, wherein the base comprises a flange, and the mold holder is located on the flange.

3. The stamping mold as claimed in claim 2, wherein the mold holder comprises a supporting portion extending downwardly from the edge of the mold holder and located on the flange.

4. The stamping mold as claimed in claim 1, wherein the protruding block comprises a top surface and two opposing slope surfaces respectively communicating the top surface with the supporting surface along a circumference direction of the supporting surface.

5. The stamping mold as claimed in claim 1, wherein the second through hole is a stepped hole, and a stepped surface is formed in the second through hole to support the spring.

6. The stamping mold as claimed in claim 1, wherein the positioning shaft further comprises a connecting portion structured between the position portion and the cover and is movably received in the second through hole, and a stop surface is formed between the positioning portion and the connecting portion.

7. The stamping mold as claimed in claim 1, wherein the mold holder further comprises a handle projecting outwardly from a periphery thereof.

8. The stamping mold as claimed in claim 1, further comprising an indicator located on a periphery of the cover of the stripper that corresponds to the protruding block.

9. The stamping mold as claimed in claim 1, further comprising an indicator located on a periphery of the base that corresponds to the protruding block.

10. The stamping mold as claimed in claim 1, further comprising an elastic ring arranged around the plurality of mold inserts to secure the mold inserts.

11. A stamping mold to stamp characters in workpieces, comprising:

a base comprising a supporting surface and a protruding block extending upwardly from the supporting surface, and defining a first through hole in a center of the supporting surface;

a mold holder rotatably installed on the base and defining a second through hole corresponding to the first through hole and a plurality of receiving holes arranged in a circular array around the second through hole;

a plurality of mold inserts received in the plurality receiving holes respectively, and selectively corresponding to the protruding block, wherein each of the plurality of mold inserts comprises a character locating on a top thereof, wherein a height of each character is substantially equal to that of the protruding block;

a stripper comprising a cover and a positioning shaft projecting vertically from the cover, the cover defining a plurality of passage holes arranged in a circular array around the positioning shaft, wherein the positioning shaft comprises a positioning portion passing through the second and first through holes, in turn, and a stopper portion stopped below the base to prevent the positioning shaft from moving out of the first and second through holes, wherein the positioning portion matches with the first through hole to prevent the stripper from rotating relative to the base; and a spring coiled around the positioning shaft with two ends respectively abutting against the cover and the mold holder to space the cover from the mold holder;

wherein during stamping characters, the mold holder is driven to rotate about the positioning shaft of the stripper until selected one of the mold inserts is pushed up by the protruding block, then the stripper is pressed down toward the mold holder, and the pushed mold insert passes through corresponding one of the passage hole in the stripper and exposed out of the cover to stamp the workpieces.

12. The stamping mold as claimed in claim 11, wherein the base comprises a flange, and the mold holder is located on the flange.

13. The stamping mold as claimed in claim 12, wherein the mold holder comprises a supporting portion extending downwardly from the edge of the mold holder and located on the flange.

14. The stamping mold as claimed in claim 11, wherein the protruding block comprises a top surface and two opposing sloped side surfaces respectively communicating the top surface with the supporting surface along a circumference direction of the supporting surface.

15. The stamping mold as claimed in claim 11, wherein the second through hole is a stepped hole, and a stepped surface is formed in the second through hole to support the spring.

16. The stamping mold as claimed in claim 11, wherein the positioning shaft further comprises a connecting portion structured between the position portion and the cover and is movably received in the second through hole, and a stop surface is formed between the positioning portion and the connecting portion.

17. The stamping mold as claimed in claim 11, wherein the mold holder further comprises a handle projecting outwardly from a periphery thereof.

18. The stamping mold as claimed in claim 11, further comprising an indicator located on a periphery of the cover of the stripper that corresponds to the protruding block.

19. The stamping mold as claimed in claim 11, further comprising an indicator located on a periphery of the base that corresponds to the protruding block.

20. The stamping mold as claimed in claim 11, further comprising an elastic ring arranged around the plurality of mold inserts to secure the mold inserts.

* * * * *